United States Patent [19]

Gomm et al.

[11] 3,956,629

[45] May 11, 1976

[54] INSPECTION METHOD AND APPARATUS

[75] Inventors: Thiel J. Gomm, Castle Rock; Stephen E. Price, Lakewood, both of Colo.

[73] Assignee: Inex, Inc., Denver, Colo.

[22] Filed: June 9, 1975

[21] Appl. No.: 584,797

[52] U.S. Cl.............................. 250/223 R; 250/209; 356/205; 235/61.11 E
[51] Int. Cl.² ........................................ G01D 21/04
[58] Field of Search............ 250/223 R, 222 R, 224, 250/209; 356/156–158, 71, 167, 212, 205; 235/61.11 E, 92 V

[56] References Cited
UNITED STATES PATENTS

| | | | |
|---|---|---|---|
| 3,591,294 | 7/1971 | Neil ..................................... | 356/167 |
| 3,754,120 | 8/1973 | Fitzgerald et al. ........... | 235/61.11 E |
| 3,788,749 | 1/1974 | George .............................. | 356/71 X |
| 3,894,215 | 7/1975 | Lotter et al. ............. | 235/61.11 E X |

Primary Examiner—Walter Stolwein
Attorney, Agent, or Firm—Thomas W. O'Rourke

[57] ABSTRACT

Method and apparatus for inspection similar articles by first passing an ideal sample article through the field of view of a scanning array, generating a train of pulses corresponding to the image falling on the scanning array by sequentially interrogating each sensor in the array in response to a clock frequency, selecting discrete pulses from the train of pulses which are indicative of the characteristics of the sample article, and preferably pulses indicating perturbations, storing data identifying the selected pulses in a sample memory, sequentially passing other articles to be inspected past the scanning array and similarly generating and storing the identification data for selected characteristics pulses in an object memory, and comparing the stored data in the sample and object memories for correspondence between the data within preselected tolerances to determine correlation, or the absence of correlation, between the same article and each article to be inspected.

22 Claims, 4 Drawing Figures

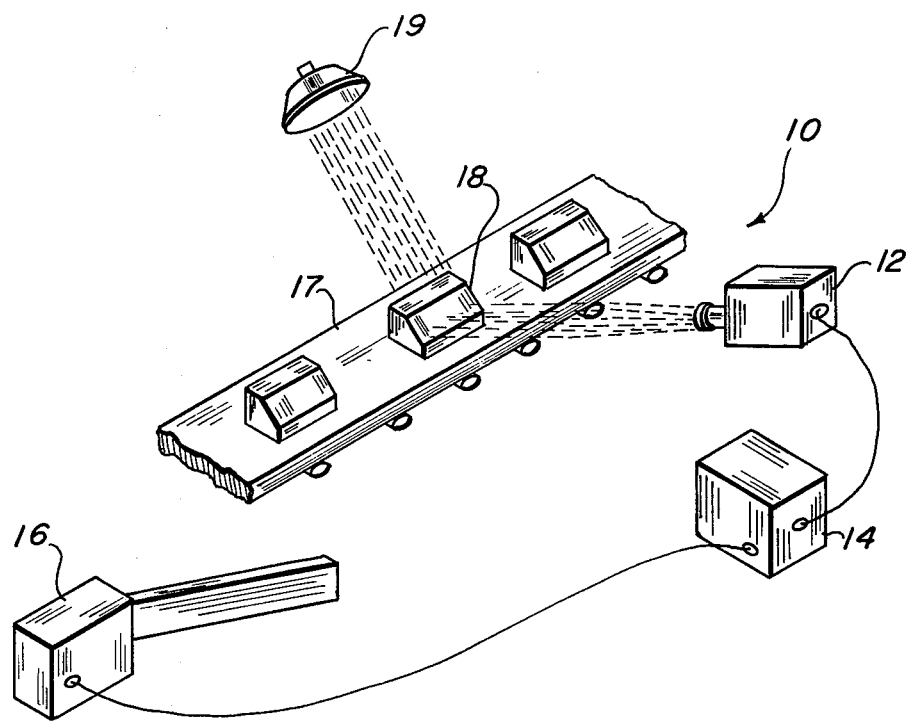
Fig_1

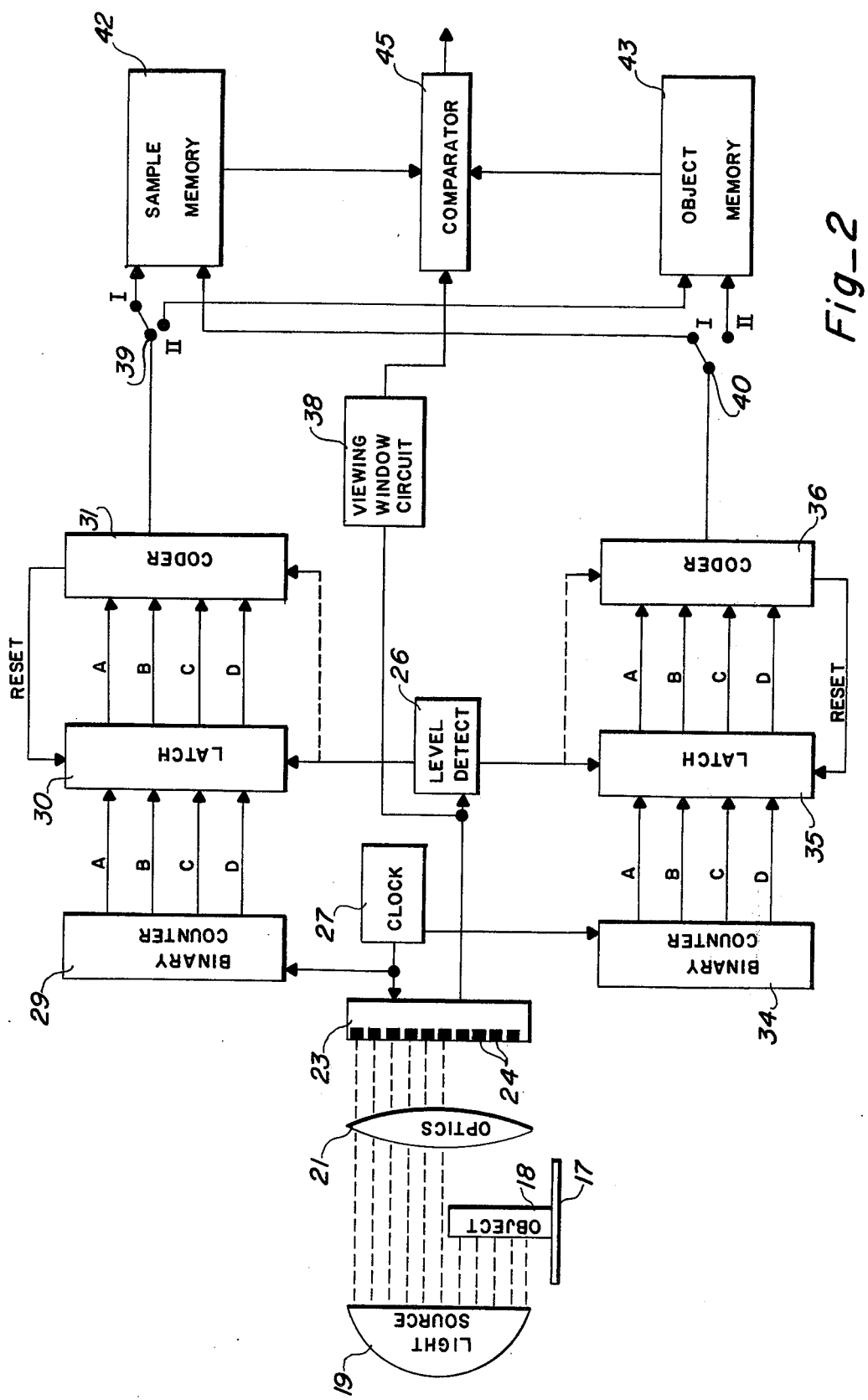
Fig_2

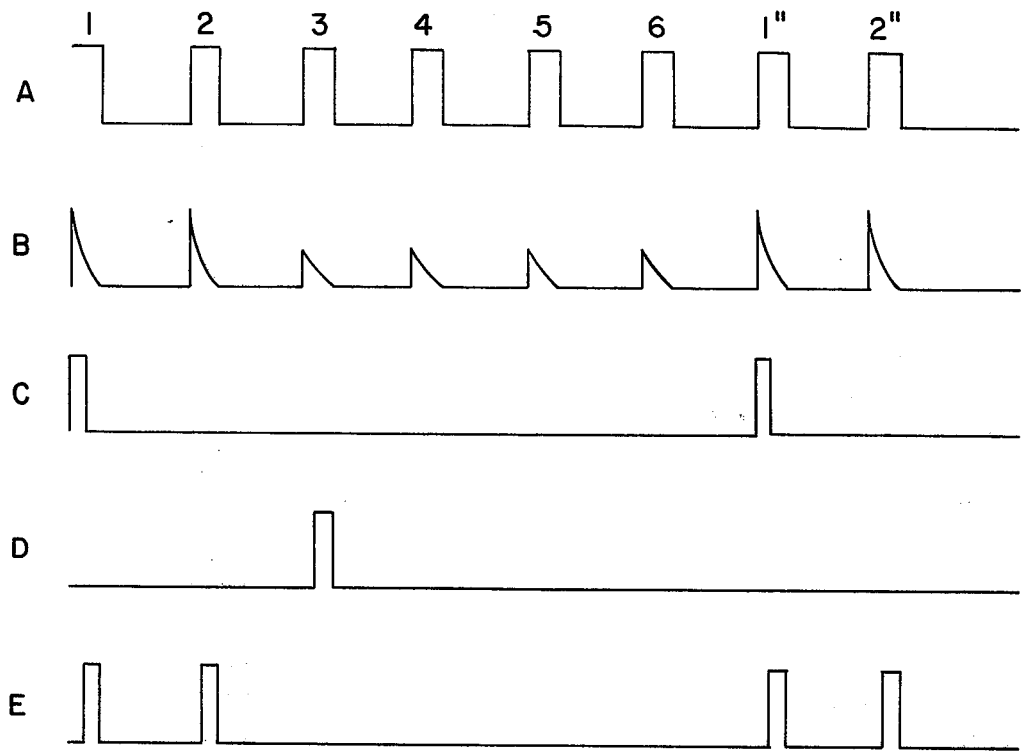
Fig_3
TABLE
| | SWEEP COUNTER | | | | ARRAY COUNTER | | | | DET MODE | |
|---|---|---|---|---|---|---|---|---|---|---|
| | A | B | C | D | A | B | C | D | I | II |
| 1 | 1 | 0 | 0 | 0 | 1 | 0 | 0 | 0 | | X |
| 2 | 1 | 0 | 0 | 0 | 0 | 1 | 0 | 0 | | X |
| 3 | 1 | 0 | 0 | 0 | 1 | 1 | 0 | 0 | X | |
| 4 | 1 | 0 | 0 | 0 | 0 | 0 | 1 | 0 | | |
| 5 | 1 | 0 | 0 | 0 | 1 | 0 | 1 | 0 | | |
| 6 | 1 | 0 | 0 | 0 | 0 | 1 | 1 | 0 | | |
| 1' | 0 | 1 | 0 | 0 | 1 | 0 | 0 | 0 | | X |
| 2' | 0 | 1 | 0 | 0 | 0 | 1 | 0 | 0 | | X |
Fig_4

3,956,629

INSPECTION METHOD AND APPARATUS

BACKGROUND OF THE INVENTION

1. Field of the Invention

The present invention relates generally to apparatus and method for inspecting articles, and particularly to apparatus method for more rapidly and accurately comparing the characteristics of an article being inspected with the characteristics of an ideal sample article with a minimum of stored data.

2. Description of Prior Art

The desirability of electronically comparing the characteristics of a sample article with the characteristics of an article to be inspected has been recognized for some time. To accomplish this, the prior art generally a complete image signal, usually an analogue signal. In some instances the analogue image signal is processed to a digital signal, and in certain instances further processed to record less than the data required to reproduce an image of the subject. The prior art often stores only a "standard" image and compared the image of the article to be inspected with the "Standard" image in real time.

Typical of such prior art concepts are the teachings of U.S. Pat. No. 3,777,169 issued Dec. 4, 1974, and related U.S. Pat. No. 3,598,907, issued August 10, 1971. In this concept, an analogue TV image signal is produced and processed to digital form. Only signals exceeding a threshold voltage are entered into the memory. The stored video pattern from the ideal or previous scan is then compared in real time with a later scan. In the event of lack of comparison, a reject signal is generated.

Other electronic inspection systems include U.S. Pat. No. 3,576,442, issued Apr. 27, 1971 and U.S. Pat. No. 3,746,784, issued July 17, 1973. In general, the prior art inspection systems utilize a video or analogue sensing mechanism, the inspection is generally for impurities or blemishes and accordingly a surplus of data is generated and processed by such means as edge detection systems and suppression systems.

SUMMARY OF THE INVENTION

The present invention which provides a heretofore unavailable improvement for inspection systems and methods comprises an apparatus for generating a series of pulses from discrete sensors in a scanning array of sensors. The magnitude of the individual pulse is indicative of the image radiation falling on an individual sensor. The sensors are individually interrogated in response to a clock frequency. When a significant characteristic of the article being examined is observed by the sensors, the occurrence is entered into either a sample memory or an object memory depending upon the nature of the article being examined. Typical of a significant occurrence is pulse magnitude above a predetermined level, or preferably a change in the magnitude of adjacent pulses indicating a perturbation. The clock drives counters both on an individual primary clock frequency and on a scan frequency. Thus on the occurrence of a substantial event as observed by the scanning array, the count of both the scan and the primary individual sensor observing the occurrence is entered in an appropriate object or sample memory, or compared therewith.

The characteristics of an ideal sample article are entered into the sample memory. Thereafter the characteristics of an article to be inspected are similarly entered into an object memory. The sample and object characteristics are compared and, in the event of coincidence within predetermined tolerances an article is accepted. In the event of the absence of coincidence within the tolerances, a reject signal is generated and utilized in a conventional manner. Articles to be inspected are sequentially entered into the object memory as each is conveyed past the scanning array.

Accordingly an object of the present invention is to provide new and improved methods and apparatus for comparing an article to be inspected with an ideal sample article.

Another object of the present invention is to provide a new and improved method and apparatus for inspecting and comparing articles utilizing a sensing array having discrete sensors which are sequentially interrogated.

Yet another object of the present invention is to provide a new and improved method for inspecting and comparing articles in which only minimal significant data concerning the article are preserved and stored for comparison.

Yet another object of the present invention is to provide a new and improved apparatus for inspecting and comparing articles in which the inspection of the article is initially accomplished in response to a clock frequency, and data concerning the significant characteristics of the article are stored in terms of the clock frequency.

Still another object of the present invention is to provide a new and improved method and apparatus for inspecting and comparing articles in which the stored data characteristics of a standard article may be compared to the stored data characteristics of an article to be inspected in nonreal time with regard to the inspection of either or both articles.

A further object of the present invention is to provide a new and improved method and apparatus for inspecting and comparing articles in which the degree of correspondence between an ideal article and an article to be inspected may be varied to establish tolerances.

These and other objects and features of the present invention will become apparent from the reading and consideration of the following description.

BRIEF DESCRIPTION OF THE DRAWINGS

In the drawing

FIG. 1 is a simplified perspective view of an apparatus according to the instant invention;

FIG. 2 is a block diagram of an inspection device according to the instant invention;

FIG. 3 is a timing chart of various functions according to differing embodiments of the instant invention; and FIG. 4 is a table illustrating the information available and used according to the different embodiments of the instant invention.

DETAILED DESCRIPTION OF THE INVENTION

Turning now to the drawings, wherein like components are designated by like reference numerals throughout the various figures, an inspection apparatus in accordance with the instant invention is illustrated in FIG. 1 and generally designated by the reference numeral 10. As will be described in more detail hereinafter, inspection apparatus 10 generally includes light detector 12, data processor 14, rejection mechanism 16, and conveyor 17. In operation, articles 18 are carried sequentially past a light source 19 and concurrently viewed by light detector 12. The characteristics of each article 18 are compared with ideal characteristics of a sample article in data processor 14. If differences exist beyond a predetermined threshold, reject mechanism 16 is activated to cull rejected articles 18 from acceptable articles 18.

The operation and function of apparatus 10 can be more readily understood with reference to FIG. 2 in which the packaging aspects of light detector 12 and data processor 14 are omitted. Also, in FIG. 2, article 18 blocks light from light source 19 rather than reflecting or absorbing light from light source 19 as illustrated in FIG. 1. However, this merely illustrates two modes of operation with regard to the arrangement of light source 19 and article 18.

In the embodiment of FIG. 2, light from light source 19 is either blocked or passed by article 18. Optical system 21 focuses the light source image, or unblocked portion thereof, on an array 23 of photosensitive elements 24. Each photosensitive element 24 emits a signal which is a function of the intensity of light falling thereon. The serial output from array 23 is processed by discriminator 26. More specifically, each of the photosensitive elements 24 in array 23 is sequentially interrogated in response to a frequency from clock 27. Only significant data from array 23 produces a signal from discriminator 26.

The definition of significant data may vary in accordance with several modes. For instance, discriminator 26 may be made responsive to the magnitude of the difference in signal strengths from adjacent photosensitive elements 24. Thus only a perturbation is detected. Systems for accomplishing this are more fully described in our U.S. Pat. Aplications Ser. No. 381,549 for Perturbation Detector, now Patent No. 3,877,821, and Ser. No. 381,550 for Filter Discrimination Circuit.

An alternative system involves utilizing discriminator 26 to emit signals only when the signal from a photosensitive element 24 exceeds a specific threshold. As will be shown below, this is, in most instances, less desirable than the perturbation detector in that greater magnitudes of data must be handled at higher rates. Since the objects 18 often display extended light or dark areas, or extensive areas of passed or obscured light, the threshold discrimination based upon signal strength will usually involve a number of adjacent photosensitive elements 24 producing signal levels above the threshold. Accordingly, the rate at which discriminator 26 outputs data will tend to be high, particularly compared to the perturbation mode of discrimination.

Clock 27, in addition to sequentially interrogating photosensitive element 24, also provides the clock frequency to counter 29, which is preferably a binary counter but may be based upon other systems. Counter 29 merely keeps count in binary, or other, form of the number of pulses from 27 and provides the information as shown at channels A, B, C, and D to latch 30, or other responsive means to enter the data. In the event discriminator 26 provides a signal to latch 30, or other responsive means, the count at counter 29 at the time such signal is presented from discriminator 26 is entered into latch 30 and presented to coder 31. Coder 31 processes the data, if necessary, to proper form for entry into a memory as will be discussed below. In some instances the signal from discriminator 26 is provided at coder 31 as shown by the dash line. This is done when coder 31 must be activated to receive data.

In addition to the primary frequency of clock 27, a frequency which is the clock frequency divided by a number greater than 1 is provided to sweep counter 34 which also is preferably a binary counter. Accordingly, counter 34 provides at channels A, B, C, and D thereof binary, or other basis, information as to the sweep number of a specific interrogation of array 23. Sweep latch 35 and sweep coder 36 are similarly activated by discriminator 26 as described above.

It will be noted that the outputs from coder 31 and coder 36 are connected to switches 39 and 40 respectively. Further, switches 39 and 40 are arranged to supply both outputs to the sample memory 42 when in position I. Alternatively, the outputs from coder 31 and coder 36 are supplied to object memory 43 when switches 39 and 40 are in position II. Switches 39 and 40 may be mechanical switches or other switchable means such as gates, etc.

In practice, an ideal sample object 18 is conveyed past light source 19 on conveyor 17, and, in response to signals from discriminator 26 upon the sensing of significant characteristic data of ideal object 18, the data supplied in the form of the count of counter 29 and the count of counter 24 to sample memory 42. Accordingly, data corresponding to the significant characteristics of an ideal object are recorded in sample memory 42. Thereafter, switches 39 and 40 are thrown to the II position and a series of objects 18 are conveyed past light source 19 on conveyor 17. The data corresponding to significant characteristics of object 18 are stored in object memory 43. Viewing window circuit 38 senses the passing object 18 as a function of the output from array 23. By selecting the proper parameters, circuit 38 may activate comparator 45 for real time comparison of the data from an object 18 with the data stored in sample memory 42 -a mode that can be advantageously employed in conjunction with the perturbation detection approach- or, preferably, comparator 45 may be activated upon the completion of the storage of the data in object memory 43 for the object passing array 23. Comparator 45 determines if the subsequent inspected objects 18 in fact display characteristics corresponding to the characteristics of the ideal article 18 as delineated by the data stored in sample memory 42. Of course comparator 45, being a conventional circuit, can be set to both accept some discrepancies and to search for the maximum correspondence between the data from sample memory 42 and object memory 43. The output from comparator 45 can indicate either correspondence of data, or the absence thereof. In the latter case, the signal to reject mechanism 16 will cull the nonconforming objects 18 from the accepted objects 18 on conveyor 17.

The specific operation of the inspection apparatus will be more readily understood with reference to FIG. 3 wherein the various signals and outputs on a binary basis are provided on a timing chart. The clock frequency is shown as A and, for the purposes of illustration, it is assumed that the first pulse from clock 27 interrogated the uppermost of photosensitive elements 24 in array 23. Thereafter, as numbered, the subsequent photosensitive element 24 are interrogated until the bottommost, i.e., number 6, in the timing chart is interrogated. Thereafter, a second sweep of array 23 is initiated with interrogation of the uppermost of photosensitive elements 24 at 1'. Line B illustrates the signals from photosensitive element 24 in response to interrogation. It will be noted that the uppermost, i.e., 1 and 2, of photosensitive elements 24 provide a signal of greater amplitude corresponding to the unblocked radiation from light source 19. Line C illustrates the output from clock 27 to binary counter 34, i.e., the sweep count. Accordingly, at the first pulse from clock 27 an entry indicating the binary 1 is made at counter 34. This entry is maintained until pulse 1' is supplied to array 23 from clock 27 at which time a second pulse indicating a second sweep is provided from clock 27 to binary counter 34. Line D indicates the output from discriminator 26 in the preferred perburbation sensing modes. Thus, with reference to line B, the signal resulting from pulse 3 is substantially less than that of pulse 2 thereby indicating a perturbation and generating an output from discriminator 26 to latch 30 and latch 35. Though a perturbation also exists at the signal resulting from pulse 1' relative to the signal from pulse 6, this is suppressed in that it results from a new sweep and is thus not considered valid data. Finally, at line E, the outputs from discriminator 26 are shown when discriminator 26 is in the threshold voltage mode.

In FIG. 4, the binary counts existing at channel A, B, C and D of counters 34 and 29 respectively are shown for the pulse count described with regard to FIG. 3. Also, the data entered into sample or object memories 42 or 43 are indicated by the X's under the discriminator mode column. Mode 1 is the preferred perturbation method. It indicates but one entry showing significant data. On the other hand, for a complete sweep, mode 2, the threshold voltage mode, shows two entries for a complete sweep of array 23. Further, not only does mode 2 have a greater number of entries, but the entries are adjacent and thus increases the peak rate at which data must be supplied to memories 42 or 43.

From the above discussion, it will be appreciated that the method and apparatus of the instant invention provides for rapid generation of minimal data required to establish the significant characteristics of an object. This data is substantially less than that required to provide an image of the object and is initially generated in essentially digital form. Further, though real time comparisons are possible utilizing the minimal data -and are in fact more easily accomplished according to the preferred perturbation data generating method of the instant invention- the comparison of the outputs from sample memory 42 and object memory 43 can be carried out at a more convenient rate without concern for real time utilization of data received at a higher rate such as by threshold mode.

Although only several embodiments of the present invention have been illustrated and described, it is anticipated that various changes and modifications will be apparent to those skilled in the art and that such changes may be made without departing from the scope of the invention as defined by the following claims.

What is claimed is:

1. Object inspection apparatus comprising: means for transporting objects, a radiation source directed towards the transport means, an array of photosensors positioned towards the transport means to intercept the radiation, clock means producing a primary frequency and a secondary frequency with the primary frequency being higher than the secondary frequency, the primary frequency output of the clock means being connected to the photosensor array to individually and sequentially interrogate the photosensors and produce from each photosensor an output signal which is a function of the radiation falling on the photosensor, discriminator means connected to the output from the photosensor array and adapted to produce an output in response to preselected signal characteristics from the photosensor array, a first counter connected to the primary frequency output of the clock means, a first responsive means receiving the output from the first counter and connected to and responsive to the output from the discriminator means, a second counter connected to the secondary frequency output of the clock means, a second responsive means receiving the output from the second counter and connected to and responsive to the output from the discriminator means, a sample memory, comparator means adapted to compare the outputs from the sample memory and the responsive means, first switch means connected between the output of the first responsive means and alternatively connectable to one of the sample memory and the comparator, and second switch means connected to the output of the second responsive means and alternatively connectable to one of the sample memory and comparator, whereby the first and second switch means may be connected to provide data to the sample memory and an ideal sample object conveyed past the light source to produce a radiation image on the photosensitive array, an output generated from the discriminator means response to distinctive characteristics of the sample object to activate the first and second responsive means and record in the sample memory the counts of the first and second counters corresponding to such characteristics, and thereafter the first and second switch means being connected to provide similar data from objects to be inspected to the comparator, with the data from the responsive means being compared with the data from the sample memory to determine correspondence of the data from the two sources and thus determine the acceptability of the latter objects.

2. Inspection apparatus as set forth in claim 1, in which the first and second switch means are connectable to an object memory which in turn outputs to the comparator, whereby the data from the objects to be inspected may be stored in the object memory and compared with the data from the sample memory by the comparator in other than real time.

3. Apparatus as set forth in claim 1, in which the responsive means are latches.

4. Apparatus as set forth in claim 1, in which the first and second counters are binary counters.

5. Apparatus as set forth in claim 1, in which first and second coding means are interposed between the first and second responsive means and the first and second switch means respectively.

6. Apparatus as set forth in claim 1, in which optical means are interposed between the array of photosensors and the transport means.

7. Apparatus as set forth in claim 2, in which optical means are interposed between the array of photosensors and the transport means.

8. Apparatus as set forth in claim 6, in which the radiation source is positioned at a substantial angle to a straight line through the photosensor array and transport means whereby the light received by the photosensor array by the optical system is reflected from the object on the transport means.

9. Apparatus as set forth in claim 6, in which the radiation source, transport means and photosensor array are substantially aligned whereby an object will block a portion of the radiation emitting from the radiation source towards the align transport means and photosensor array.

10. Apparatus as set forth in claim 1, in which the output from the photosensor array is connected to a viewing window circuit means which distinguishes between the presence and absence of an object and outputs to activate the comparator means.

11. Apparatus as set forth in claim 10, in which the discriminator means detects and outputs upon the occurrence of a perturbation and the viewing window circuit means activates the comparator means to receive and process data from an object being inspected on a real time basis.

12. Apparatus as set forth in claim 1, in which the transport means is a conveyor belt.

13. Object inspection apparatus comprising: a conveyor belt for transporting objects, a light source directed towards a conveyor belt, an array of photosensors positioned towards the conveyor belt to intercept light therefrom, clock means producing a primary frequency and a secondary frequency with the primary frequency being at a higher rate than the secondary frequency, the primary frequency output of the clock means being connected to the photosensor array to individually and sequentially interrogate each photosensor and produce an output signal from each photosensor which is a function of the light falling thereon, discriminator means connected to the output from the photosensor array and adapted to produce an output in response to preselected signal characteristics from the photosensor array, a first binary counter connected to the primary frequency output of the clock means, a first latch means receiving the output from the first binary counter connected to and responsive to the output from the discriminator means, a second binary counter connected to the secondary frequency output of the clock means, a second latch means receiving the output from the second binary counter and connected to and responsive to the output from the discriminator means, a sample memory, an object memory, first switch means connected between the output of the first latch means and alternatively connectable to one of the sample and object memories, second switch means connected between the output of the second latch means and alternatively connectable to one of the sample and object memories, and comparator means connected to the sample and object memories and adapted to compare the data from the sample and object memories to determine correspondence of the data within predetermined limits and produce a signal as a function of the presence of absence of such correspondence, whereby data from the first and second latch means may be alternatively entered into the sample memory, in the case of an ideal sample object, and the object memory, in the case of an object to be inspeced, and the data compared to determine the correspondence of the data characteristic of the object to be inspected with the sample object data to establish acceptance or rejection of the object.

14. Apparatus as set forth in claim 13, in which the discriminator means outputs upon the occurrence of a perturbation in the signals from the photosensors.

15. Apparatus as set forth in claim 13, in which the discriminator means outputs upon the occurrence of a signal from the photosensors above a predetermined level.

16. An object inspection method comprising: moving an ideal object of the type to be inspected past a source of radiation, intercepting radiation from the direction of the object and directing the intercepted radiation onto an array of photosensitive elements, generating a clock frequency, sequentially and individually interrogating the individual photosensors in the array in accordance with the clock frequency, conducting the output from the individual photosensors in response to the clock frequency to a discriminator means, counting the clock frequency in a counter and applying the output from the counter to a responsive means, generating an output from the discriminator means in response to predetermined signal characteristics from the photosensitive array, outputting data from the responsive means to a sample memory in response to the output from the discriminator means, passing another oject to be inspected through the source of radiation, generating outputs of the discriminator means in response to signals from the photosensor array corresponding to the characteristics of the object to be inspected, outputting data at the responsive means to a comparator in response to the outputs from the discriminator means, comparing the data thus produced with regard to an object to be inspected with the data from an ideal object stored in the sample memory, and accepting or rejecting the object to be inspected based upon the establishment within predetermined limits of correspondence between the data by the comparator.

17. A method as set forth in claim 16, in which the data at the responsive means produced by an object to be inspected is conducted to an object memory upon an output from the discriminator means, and the data from the sample memory and object memory are compared by the comparator means.

18. A method as set forth in claim 16, in which the discriminator means outputs to activate the responsive means on receipt from the photosensor array of a signal which varies substantially from the preceeding signal from the photosensor array.

19. A method as set forth in claim 16, in which a second clock frequency is generated at a lower frequency than the first clock frequency, the second frequency is applied to a second conductor, the output from the second counter is applied to a second responsive means and the second responsive means is responsive to an output from the discriminator means with the output being applied through the switch means to the same component as the output from the first latch means.

20. An object inspection method comprising: moving an ideal object of the type to be inspected past a light source, intercepting light from the direction of the object, directing the intercepted light onto an array of photosensitive elements, generating a first and a second clock frequency with the first clock frequency being a higher frequency than the second clock frequency, sequentially and individually interrogating the individual sensors in the array in accordance with the first clock frequency, conducting the output from the individual photosensors in response to the clock frequency to a discriminator means, counting the first clock frequency in a first counter and applying the count output from the first counter to a first responsive means, generating an output from the discriminator means in response to predetermined signal characteristics from the photosensitive array, outputting count data from the first responsive means to a sample memory in response to the output from the discriminator means, counting the second clock frequency in a second counter and applying the count output from the second counter to a second responsive means, outputting count data from the second responsive means to the sample memory in response to the output from the discriminator means, passing another object to be inspected through the light source, generating outputs from the discriminator means in response to signals from the photosensor array corresponding to the characteristics of the object to be inspected, outputting count data from the first and second latch means to an object memory in response to the outputs from the discriminator means, and comparing the count data in the sample memory and object memory in a comparator to determine correspondence or lack of correspondence between the data.

21. A method as set forth in claim 20, in which the first and second counters are binary counters.

22. A method as set forth in claim 20, in which the responsive means are latches.

* * * * *

UNITED STATES PATENT AND TRADEMARK OFFICE
CERTIFICATE OF CORRECTION

PATENT NO. : 3,956,629
DATED : May 11, 1976
INVENTOR(S) : Thiel J. Gomm and Stephen E. Price It is certified that error appears in the above-identified patent and that said Letters Patent are hereby corrected as shown below:

Column 1, line 16, after "generally" insert --generates--.

Column 2, line 2, after "object" insert --memory--.

Column 5, line 13, correct the spelling of "perburbation" to --perturbation--.

Column 8, line 44, delete "conductor" and insert --counter--.

Signed and Sealed this

Twentieth Day of July 1976

[SEAL]

Attest:

RUTH C. MASON
Attesting Officer

C. MARSHALL DANN
Commissioner of Patents and Trademarks